United States Patent [19]
Longley

[11] 3,896,075
[45] July 22, 1975

[54] FRICTION MATERIALS
[75] Inventor: John William Longley, Bradford, England
[73] Assignee: BBA Group Limited, Cleckheaton, England
[22] Filed: Nov. 3, 1972
[21] Appl. No.: 303,364

[30] Foreign Application Priority Data
Nov. 4, 1971 United Kingdom............... 51434/71

[52] U.S. Cl. .............. 260/38; 106/36; 260/DIG. 39
[51] Int. Cl.². C08K 3/22; C08K 3/36; C08L 67/10
[58] Field of Search .......... 106/36; 260/38, DIG. 39

[56] References Cited
UNITED STATES PATENTS
1,823,591  9/1931  de Lukacsenics..................... 106/36
2,159,935  5/1939  Sanders............................. 106/36 X
2,554,548  5/1951  Albognac..................... 260/DIG. 39
2,664,359  12/1953  Dingledy.............................. 106/50

FOREIGN PATENTS OR APPLICATIONS
765,244  1/1957  United Kingdom.................. 106/50

OTHER PUBLICATIONS
Chemical Abstracts, por., 53:18424h, (1958).
Chemical Abstracts, por., 54:14509c, (1957).

Primary Examiner—Melvyn I. Marquis
Assistant Examiner—S. M. Person
Attorney, Agent, or Firm—Stevens, Davis, Miller & Mosher

[57] ABSTRACT
There is described a friction material which comprises basalt fibres and a thermosetting resin binder. The basalt fibres are preferably used in complete substitution for the asbestos fibres which are conventionally included in friction materials.

5 Claims, No Drawings

FRICTION MATERIALS

This invention relates to an improved friction material for friction engaging mechanisms and more particularly to a moulded friction lining for a brake or a clutch.

The optimum properties of a good friction material are an adequate coefficient of friction for the expected usage, ability to retain a constant coefficient of friction under varying conditions such as rubbing surface temperature, rubbing surface pressure and rubbing surface sliding speed, little wear on its rubbing surface and little wear or scoring on an opposed rubbing surface. Conventional friction materials, most of which are molded of a mixture mainly composed of asbestos fibres and including an organic binder such as phenol/aldehyde resin, together with fillers and additives, have not usually given an adequate balance of optimum properties.

In accordance with the broadest aspect of the present invention, there is provided a friction material which comprises basalt fibres and a thermosetting resin binder, the other constituents of the friction material, if any, being one or more fillers and/or one or more other additives.

The term "basalt" is applied to a group of volcanic rocks and defined as having a silica ($SiO_2$) content of between 45 and 50%. The name "basalt" is used to cover two distinct types of volcanic rock:
1. that trapped between other layers is termed intrusive;
2. that which flowed as a lava on the earth's surface and is termed extrusive.

Basalt fibres are conventionally prepared from the basic, extrusive, igneous form of the material. A typical analysis is:

| | |
|---|---|
| $SiO_2$ | 49.06% |
| $TiO_2$ | 1.36% |
| $Al_2O_3$ | 15.70% |
| $Fe_2O_3$ | 5.38% |
| FeO | 6.37% |
| MgO | 6.17% |
| CaO | 8.95% |
| $Na_2O$ | 3.11% |

A typical extrusive basalt consists of a basic plagioclase felspar (labradorite) and augite, with small amounts of magnetite and ilmenite.

The production of fibre from such basalts is well known to those skilled in the art and two such examples are BASALAN (Trade Mark) and MEVO (Trade Mark). Generally such fibres are produced by melt spinning followed by attenuation in a flame, or by spinning the fibre from the melt in a centrifuge sometimes accompanied by simultaneous attenuation. The diameter of the basalt fibres which are so produced and which are useful in friction materials in accordance with the present invention may range from 1 to 22 microns diameter and has a normal mean of 10 to 11 microns. The length of the basalt fibres used in a dry mix for a friction material should, however, not exceed one tenth of an inch, and it is preferred for the fibres to be about one sixteenth of an inch in length.

Accordingly, it is sometimes necessary to reduce the length of the basalt fibre before preparing a dry mix for the friction material. This reduction in fibre length is readily accomplished by mechanical attrition. The residue of basalt fibres having individual fibre lengths of the order of one sixteenth of an inch is still substantially fibrous in nature and is able to impart the desired mechanical properties such as compressive strength, cross breaking strength and shear strength to mouldings made from compositions in which it is included.

According to one aspect of the present invention, there are provided friction materials in which basalt fibres are used as a substitute for the conventional asbestos fibres.

More specifically in accordance with the present invention there is provided a friction material for friction engaging mechanisms which comprises by weight 40 to 60% of basalt fibre, 8 to 15% of thermosetting resin binder, the balance being at least one compound selected from the group consisting of fillers and additives.

In accordance with the preferred embodiment of the present invention there is provided a friction material for friction engaging mechanisms which comprises by weight 45 to 55% of basalt fibre, 8 to 15% of thermosetting resin binder, 15 to 45% of inert filler, and 0 to 30% of additive for modifying the friction properties of the material.

The present invention also comprehends a friction lining for a brake or a clutch consisting of a friction material as set forth in the preceding paragraphs.

The thermosetting resin binder consists of one or more kinds of conventional binder such as phenol/aldehyde resin. In some cases the use of binders of the known rubber resin type may be desirable. Such binders are of the butadiene-acrylonitrile or butadiene-styrene types of rubber, compounded with or mixed with phenol/aldehyde types of resins.

The inert filler may consist of one or more conventional fillers such as barytes, graphite, litharge, kaolin, chromite, metallic powders and alloy powders. The use of asbestos fibre as a filler is not precluded, but is usually not desirable or necessary in friction materials in accordance with the present invention.

The additive for modifying the friction properties of the material may consist of one or more conventional additives such as lead dioxide, lead sulphide and the polymeric products of cashew nut shell oil sometimes referred to as friction dust. Such conventional additives modify the friction properties of the material, particularly at high temperatures.

A dry mix for a friction material in accordance with the present invention is heated and moulded in a conventional manner. Friction material in accordance with the present invention has improved properties as compared with known materials, such as; substantially constant coefficient of friction over wide conditions of temperature, rubbing speed and surface rubbing pressure; reduced wear and scoring of opposed rubbing surfaces; and particular suitability for clutch and brake linings.

The present invention will be better understood from the following Examples:

EXAMPLE 1

A mix comprising the following ingredients was prepared:

| | |
|---|---|
| Basalt fibre | 5 parts |
| Phenol/aldehyde resin | 1 part |
| Chromite dust | 1 part |
| Barytes | 2 parts |
| Brass dust | 1 part |

80g. portions of the mix were moulded in a heated steel die, and the moldings were ejected hot from the die. These mouldings, which were rigid and of good appearance, were post cured.

| Density | 2.72 × 10³ Kg/m³ |
|---|---|
| Hardness | 99 Rockwell P. Scale |
| Surface shear | 35.8 MN/m² |
| Cross breaking strength | 62.7 MN/m² |
| Compressibility at 15.4 MN/m² | 0.18% |

When the mouldings were tested on a dynamometer assembly under controlled conditions, high and most uniform coefficient of friction levels were maintained over wide variations of temperature, rubbing speed, and rubbing surface pressure.

An average coefficient of friction level for this mix at 70°C - 0.41
Fade index was 4
Friction level at 240°C was 0.38
Fade index is an arbitrary measure of fade, the lower the figure the less the amount of fade.

EXAMPLE 2

A mix comprising the following ingredients was prepared:

| Basalt fibre | 10 parts |
|---|---|
| Phenol/aldehyde | 2 parts |
| Chromite dust | 2 parts |
| Barytes | 4 parts |
| Brass dust | 2 parts |
| Cashew nut shell oil polymer | 2 parts |

100 g. portions of the mix were moulded in a heated steel die, and the mouldings were ejected hot from the die. These mouldings, which were rigid and of good appearance, were post cured.

When the mouldings were tested on a dynamometer assembly under controlled conditions, high and most uniform coefficient of friction levels were maintained over wide variations of temperature, rubbing speed and rubbing surface pressure.

| An average coefficient of friction for these mouldings at 70°C was | 0.425 |
|---|---|
| An arbitrary measure of fade (face index) was | 4.25 |
| Friction level at 240°C was | 0.395 |

EXAMPLE 3

A mix comprising the following ingredients was prepared:

| Basalt fibre | 10 parts |
|---|---|
| Phenol/aldehyde resin | 2 parts |
| Chromite dust | 2 parts |
| Barytes | 4 parts |
| Rubber dust (tyre crumb) | 2 parts |
| Brass dust | 2 parts |

80 g. portions of the mix were moulded in a heated steel die and the mouldings were ejected hot from the die. These mouldings were rigid and of good appearance. The mouldings were post cured.

When tested as in Example 1, most uniform coefficient of friction levels were maintained over wide variations of temperature, rubbing speed and rubbing surface pressure.

| An average coefficient of friction level at 70°C was | 0.34 |
|---|---|
| (Fade index) was | 2.0 |
| Friction level at 240°C was | 0.325 |

EXAMPLE 4

A mix was made comprising the following ingredients:

| Basalt fibre | 5 parts |
|---|---|
| Barytes | 3 parts |
| Phenol/aldehyde resin | 1 part |
| Brass dust | 1 part |

100 g. portions of the mix were moulded in a heated steel die, and the mouldings ejected hot from the die. These mouldings, which were rigid and of good appearance, were post cured.

When the mouldings were tested as in Example 1, high and uniform coefficient of friction levels were maintained over wide variations of temperature, rubbing speed and rubbing surface pressure.

| An average coefficient of friction level at 70°C was | 0.39 |
|---|---|
| Fade index was | 6.5 |
| Friction level at 240°C was | 0.375 |

EXAMPLE 5

A mix comprising the following ingredients was prepared:

| Basalt fibre | 500 g. |
|---|---|
| Phenol/aldehyde resin | 100 g. |
| Barytes | 120 g. |
| Lead Sulphide | 90 g. |
| Cashew nut shell oil polymer | 160 g. |
| Brass dust | 80 g. |

80g. portions of the mix were charged into a heated steel die and compression moulded for a period of 5 to 10 minutes. The mouldings were ejected hot from the die and were rigid products of good appearance which were then post cured.

The finished mouldings had the following mechanical properties:

| Density | 2.08 × 10³ Kg/m³ |
|---|---|
| Hardness | 47 Rockwell M. Scale |
| Surface Shear | 7.55 MN/m² |
| Cross breaking strength | 12.75 MN/m² |
| Compressibility at 15.4 MN/m² | 2.1% |

When the mouldings were tested on a dynamometer assembly under controlled conditions, high coefficient of friction levels were maintained over wide variations of temperature, rubbing speed and rubbing surface pressure.

When the mouldings were tested on a simulated clutch engagement machine, a high level of uniform torque was obtained over a test of 2000 cycles, with a very desirable temperature variation of 20°C.

| Average friction at 70°C | 0.36 |
|---|---|

```
                                        -Continued
Fade index                                           6.0
Friction level at 240°C 0.31
```

It has consequently been found that friction materials based on basalt fibres instead of the conventional asbestos fibres are useful as clutch linings, disc brake pads and drum brake linings. In particular, friction materials based on basalt have the advantage over conventional asbestos friction materials in that they have better high temperature properties. These better high temperature properties arise from the essential stability of basalt to about 1,000°C as compared with asbestos which begins to lose combined water from its structure at about 450°C and which begins to undergo thermal decomposition at a temperature around 800°C.

Also, a friction material based on basalt has better mechanical properties than conventional frictional materials based on asbestos and in particular it has better surface shear strength and better cross-breaking strength.

I claim:
1. A friction material for friction engaging mechanisms comprising by weight
   40 to 60% of basalt fiber,
   8 to 15% of thermosetting resin binder, the balance being at least one compound selected from the group consisting of fillers and additives.
2. The friction material of claim 1, which includes 45 to 55% by weight of basalt fiber.
3. The friction material of claim 2, wherein said thermosetting resin binder is phenol/aldehyde resin.
4. A friction material for friction engaging mechanisms which comprises by weight
   45 to 55 % of basalt fiber,
   8 to 15 % of thermosetting resin binder, and
   0 to 45 % of at least one compound selected from the group consisting of fillers and additives.
5. A friction lining for a brake or a clutch consisting of a friction material according to claim 1.

* * * * *